March 28, 1939.  E. E. GIESEN  2,152,039
AUTOMATIC CHANGE SPEED TRANSMISSION
Filed June 29, 1935  6 Sheets-Sheet 1
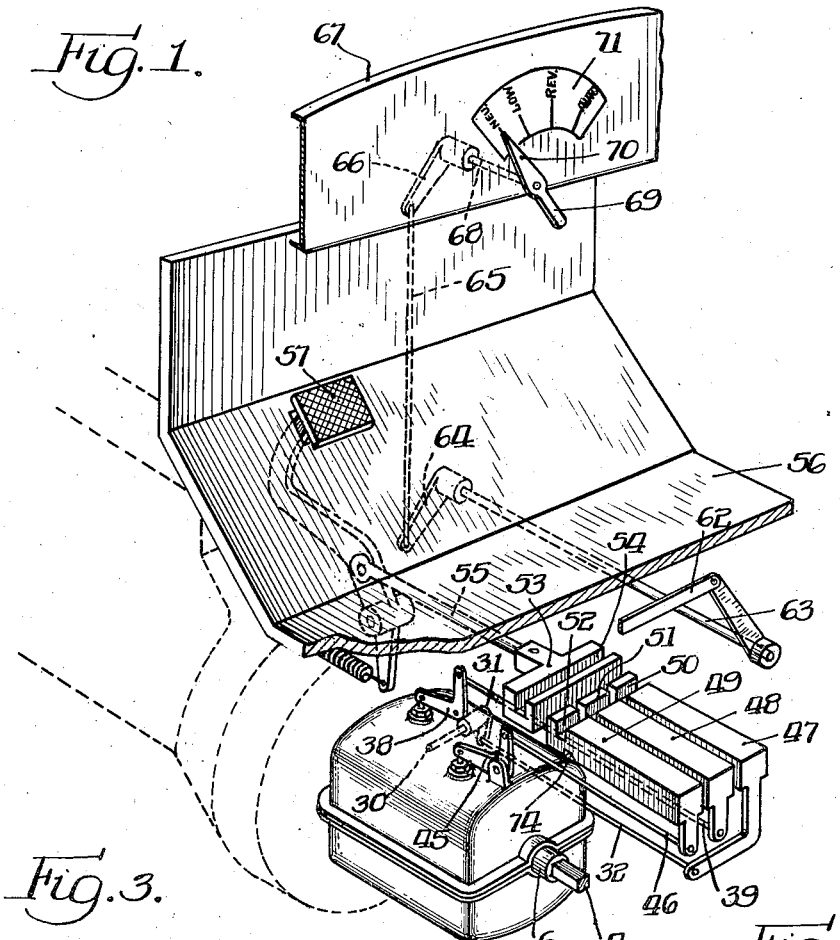
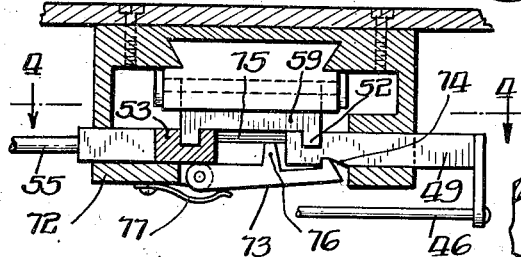
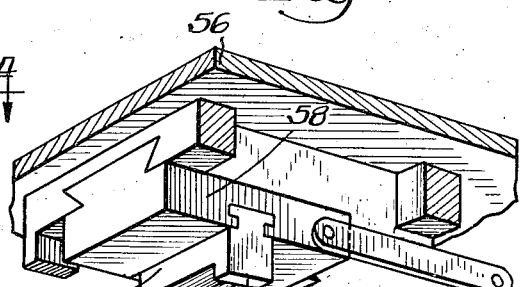
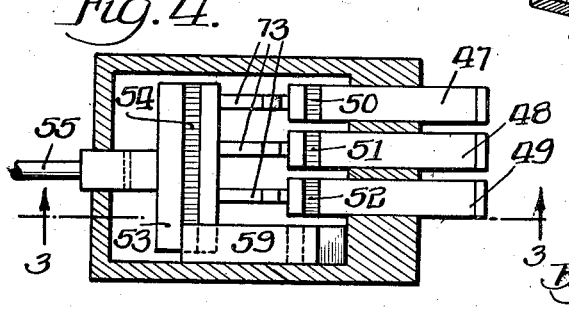
Inventor:-
Edward E. Giesen
By Arthur F. Durand
Atty.

March 28, 1939.   E. E. GIESEN   2,152,039
AUTOMATIC CHANGE SPEED TRANSMISSION
Filed June 29, 1935   6 Sheets-Sheet 2
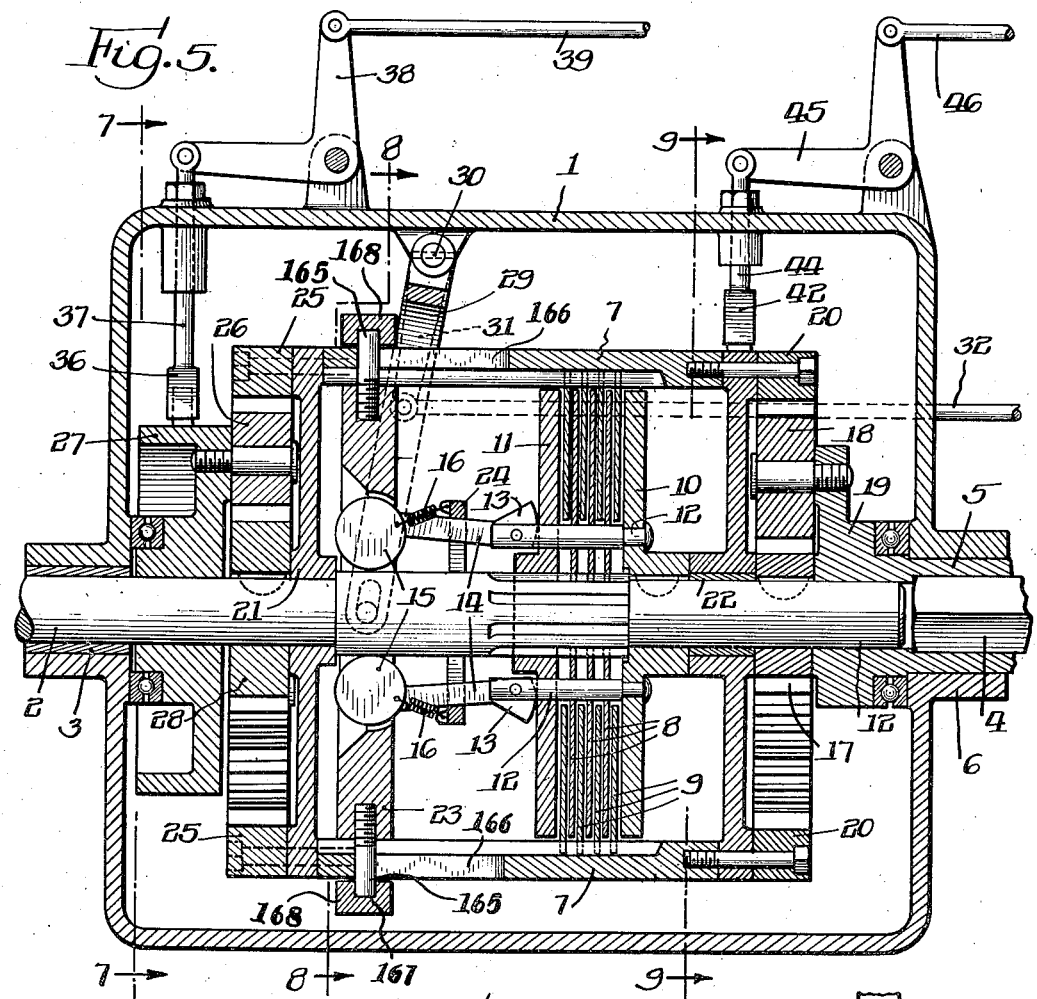
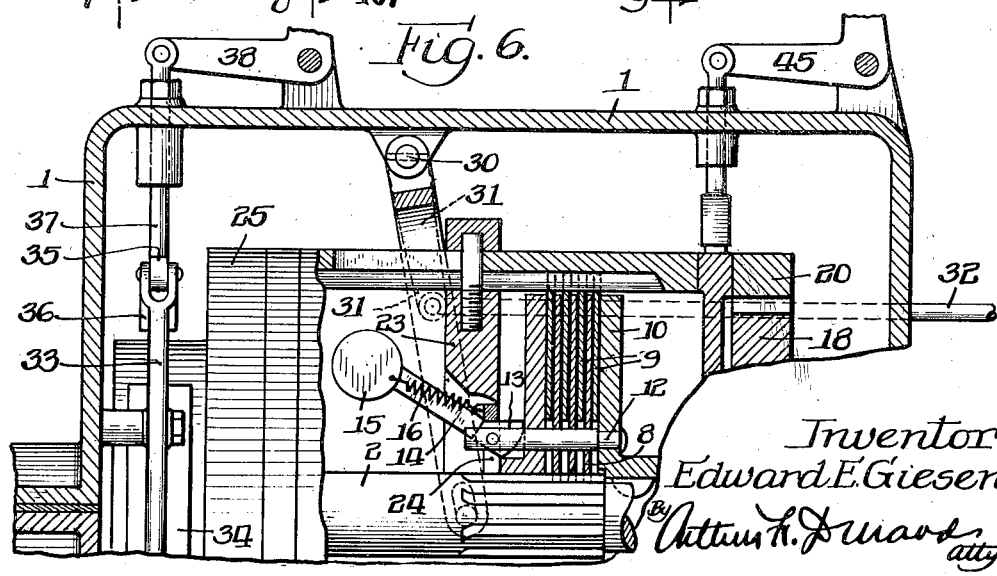
Inventor:
Edward E. Giesen

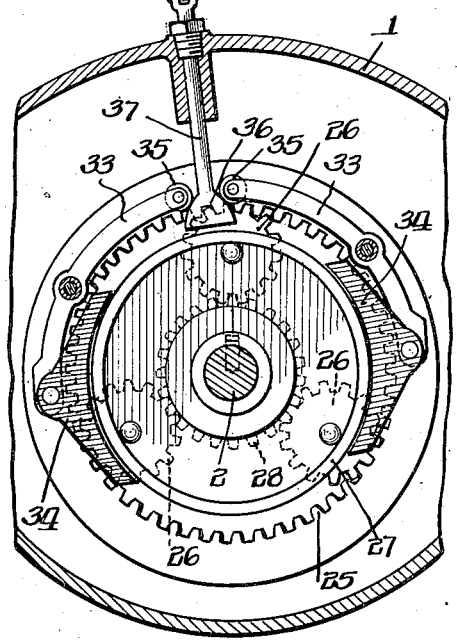

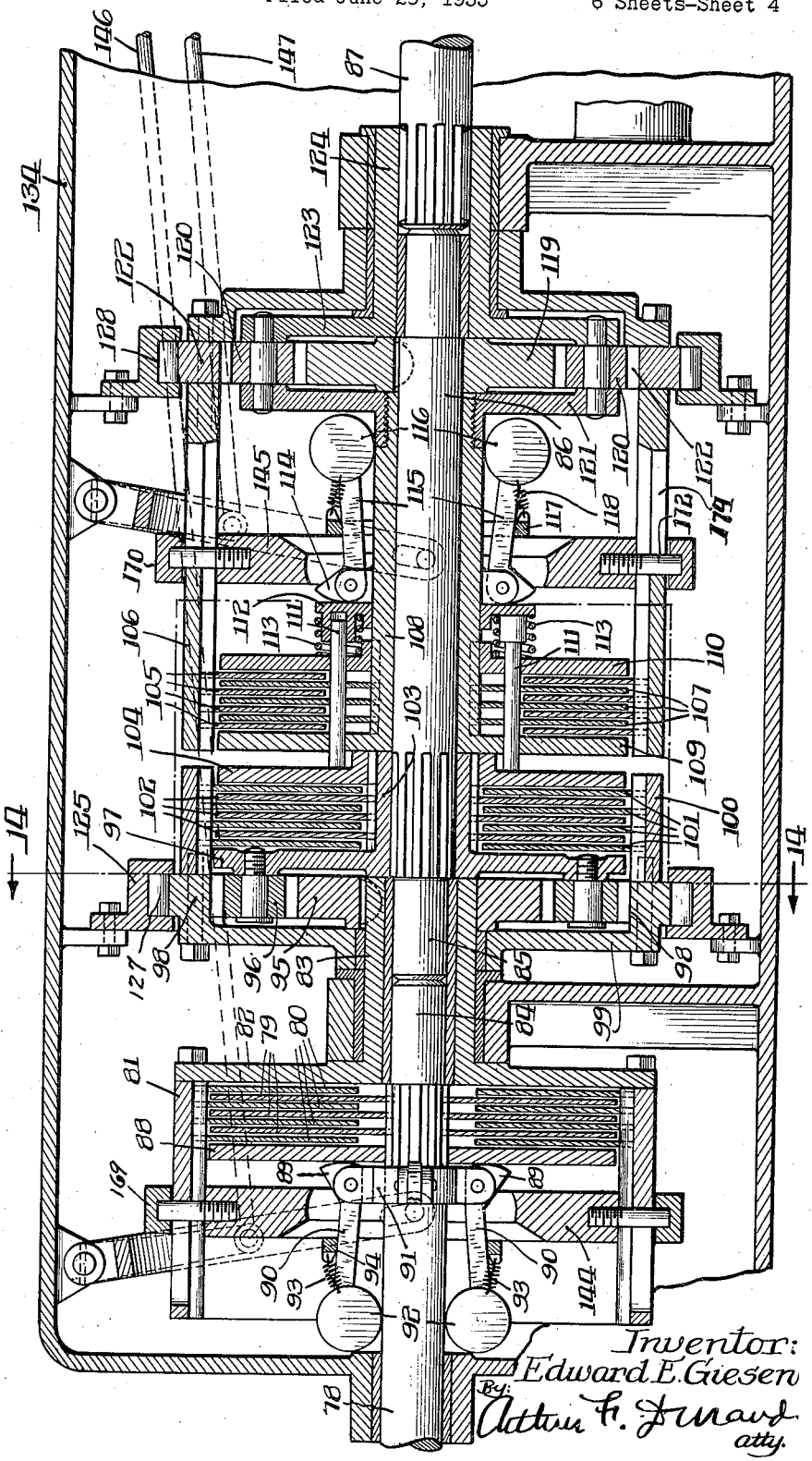

March 28, 1939. E. E. GIESEN 2,152,039
AUTOMATIC CHANGE SPEED TRANSMISSION
Filed June 29, 1935 6 Sheets-Sheet 5

Inventor:
Edward E. Giesen
By Arthur F. Furavd
Atty.

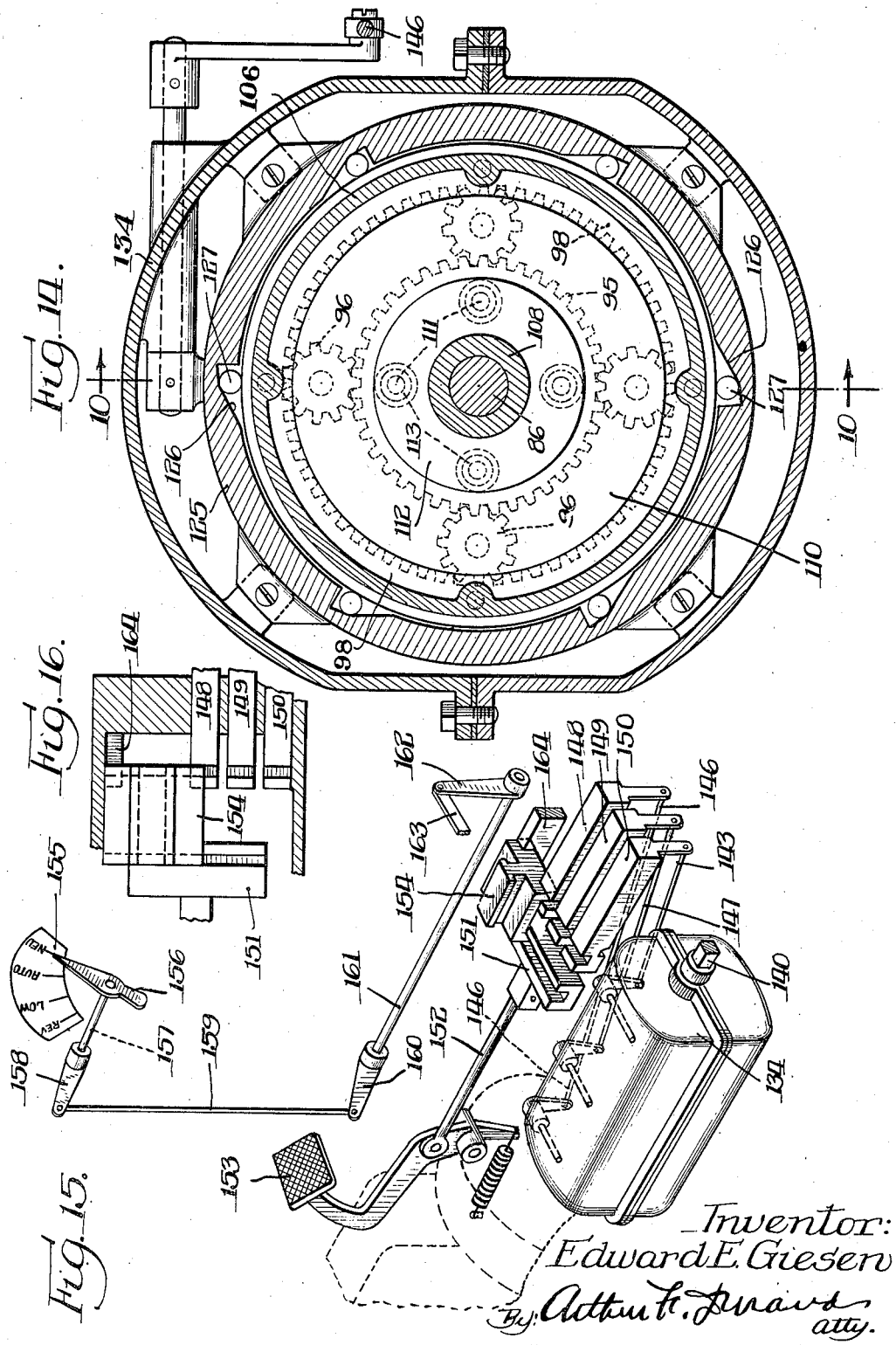

Patented Mar. 28, 1939

2,152,039

UNITED STATES PATENT OFFICE 2,152,039

AUTOMATIC CHANGE SPEED TRANSMISSION

Edward E. Giesen, Chicago, Ill.

Application June 29, 1935, Serial No. 29,087

28 Claims. (Cl. 74—262)

This invention relates to variable speed transmission gearing, for use on motor vehicles, for example, or in other places where a variable speed is desired, and it relates more particularly to gearing of this kind in which the change from low speed to high speed, and vice versa, is accomplished automatically, without the necessity of using an ordinary gear shaft or other similar manual control.

Generally stated, the object of the invention is to provide a novel and improved construction and arrangement whereby the power is advantageously transmitted through an automatic centrifugally controlled clutch to planetary gearing, and through the latter to the output shaft of the variable speed transmission thus formed, in such a manner that while the said output shaft and the input shaft of the transmission first rotate at a ratio approximately the same as that of an ordinary change speed transmission, in starting the motor vehicle forward, the action is such that the input shaft and the output shaft finally rotate in unison, for the maximum speed of travel of the motor vehicle.

It is also an object to provide certain details and features of construction and novel combinations tending to increase the general efficiency and the desirability of a variable speed transmission gearing of this particular character.

To the foregoing and other useful ends, the invention consists in matters hereinafter set forth and claimed and shown in the accompanying drawings, in which—

Fig. 1 is a perspective, more or less diagrammatic, of a variable speed transmission gearing, and the controls therefor, embodying the principles of the invention.

Fig. 2 is a fragmentary perspective view of a portion of said controls.

Fig. 3 is a longitudinal section on line 3—3 in Fig. 4 of the drawings.

Fig. 4 is a horizontal section on line 4—4 in Fig. 3 of the drawings.

Fig. 5 is a longitudinal vertical section of the said transmission gearing shown in Fig. 1 of the drawings, showing the parts in certain positions.

Fig. 6 is a similar view, with certain portions shown broken away for convenience of illustration, showing the parts in different position.

Fig. 7 is a transverse vertical section on line 7—7 in Fig. 5 of the drawings, on a smaller scale.

Fig. 8 is a similar transverse section on line 8—8 in Fig. 5 of the drawings.

Fig. 9 is a similar section on line 9—9 in Fig. 5 of the drawings.

Fig. 10 is a section similar to Fig. 5 of the drawings, showing a different form of the invention.

Fig. 14 is a transverse section on line 14—14 in Fig. 10 of the drawings.

Fig. 15 is a perspective view, more or less diagrammatical, of the form of transmission shown in Fig. 10 of the drawings, and showing the controls therefor.

Fig. 16 is a fragmentary sectional view, showing certain portions of the controls involved in the construction shown in Fig. 15 of the drawings.

Figure 11:
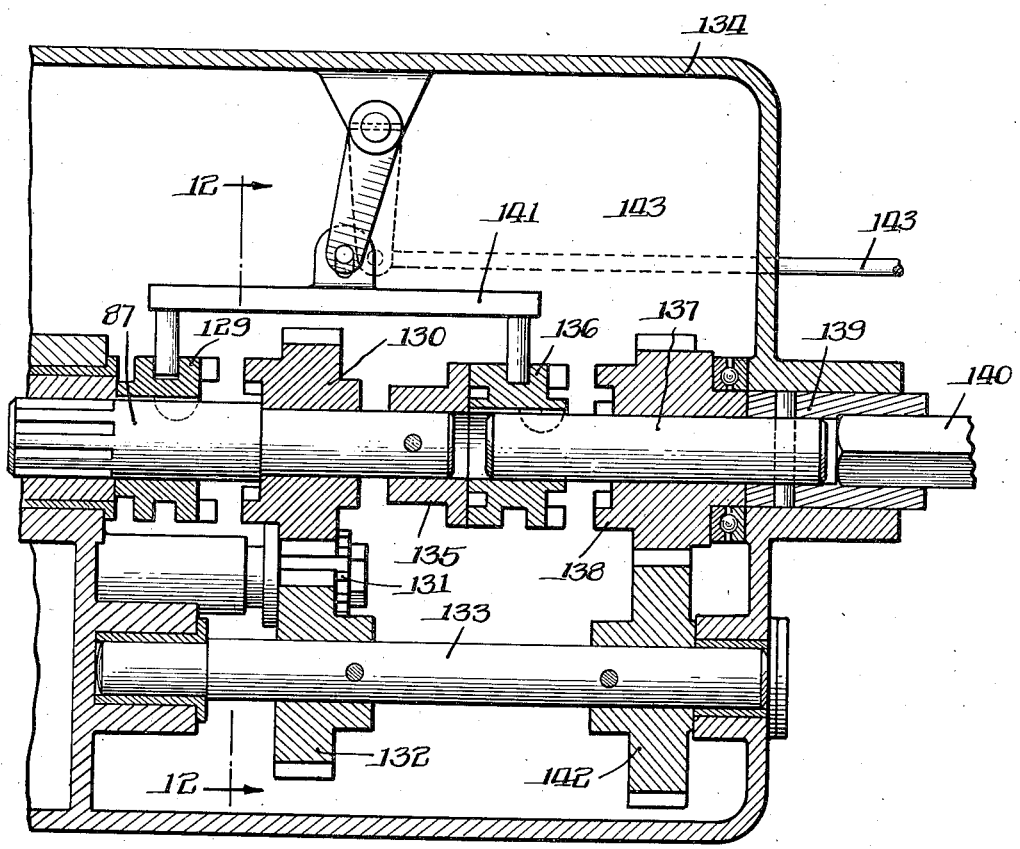
Fig. 11 is a longitudinal section of the parts and mechanism shown omitted or broken away at the right of Fig. 10 of the drawings.

As illustrated in Figs. 1 to 9 of the drawings, the construction of the variable speed transmission gearing comprises a suitable casing 1, constructed in sections in any suitable or desired manner, to form the housing for the enclosed portions of the transmission gearing. The input shaft 2 is supported in the bearing 3, at one end of said housing, and the output shaft 4 is supported in the sleeve 5, which latter is supported for rotation in the bearing 6 at the other end of the housing. Inside the housing, and inside the cylindrical body or drum 7 of the transmission, there is a clutch having its plates or disks 8 slidingly keyed to the shaft 2, and having its plates or disks 9 slidingly keyed to the body 7, as shown. The outside heavy clamping plate 10 of the clutch is fixed on the shaft 2, while the other clamping plate 11 is slidable on the shaft. The plates 10 and 11 are tied together by pins 12, having their left ends provided with pivoted cams 13 bearing against the plate 11, and these cams have arms 14 provided with balls or weights 15, held normally against the shaft 2 by the springs 16 that are properly adjusted as to tension. The pinion 17, of the planetary gearing shown in Fig. 9 of the drawings, is keyed to the shaft 2, but the planet gears 18 are mounted on the planet gear-carrier 19 that is free to rotate on the shaft 2, and that is integral with the sleeve 5 previously mentioned, and in this connection it will be seen that the output shaft 4 is formed or keyed to rotate in unison with the sleeve 5, in the output of power or motion from this end of the transmission-gearing housing 1 previously mentioned, the ring gear 20 of the planetary gearing is, it will be seen, rigidly secured to the body 7 of the transmission, in any suitable or desired manner, and the said body has its end walls formed to rotate freely at 21 and 22 on the shaft 2, which latter is the input shaft of the transmission. The planets 18, therefore, engage the pinion 17, and also the ring gear 20, in the manner of ordinary planetary gearing.

The ring 23 is slidable axially of the transmission gearing, on the body 7, to engage or disengage the balls 15, as illustrated in Figs. 5 and 6 of the drawings, and the ring 24, to which the springs 16 are hitched, is formed to normally engage the arms 14 in the manner shown in Fig. 5 of the drawings, and is formed to be cammed into the position shown in Fig. 6 of the drawings, when the balls or weights 15 are moved away from each other by centrifugal force, as will hereinafter more fully appear.

At the input end of the housing 1, the left end of the body or drum 7 has a ring gear 25 rigid therewith, similar to the ring gear previously mentioned, and the planets 26, engaging said ring gear, are carried on the planet-carrier 27, which latter is free to rotate on the shaft 2, as indicated. The center pinion 28 of the planetary gearing thus formed is keyed on the shaft 2 and engages the said planets 26, in the manner usual with this form of planetary gearing.

The controls for the variable transmission thus constructed may be of any suitable or desired character. For example, as shown in Figs. 1 to 9 inclusive, a yokelike member 29 is pivoted on the inside of the housing at 30 and is provided with means in the form of pins extending through slots in the drum 7 for engaging the ring 23, as shown. The pivot pin 30 of the member 29 is provided externally of the housing with a crank arm 31, to which a pull-rod 32 is connected. To control the planet carrier 27, the pivoted arms or levers 33 are provided with brake-shoes 34 that engage the cylindrical outer surface of the carrier 27, in the manner shown more clearly in Fig. 7 of the drawings. The adjacent ends of the levers 33 preferably have rollers 35 that engage the wedge-shaped cam 36 on the end of the rod 37, so that when this rod moves outwardly, the cam 36 causes the arms or levers 33 to apply the brake-shoes 34 to the outer cylindrical surface of the carrier 27, to prevent rotation of the latter, as will hereinafter more fully appear. For the operation of the rod 37, a bell crank 38 is pivoted thereto, and pivoted to rock on the top of the housing 1, as shown more clearly in Fig. 5 of the drawings, and a pull-rod 39 is pivoted to the upper end of said bell crank. As shown more clearly in Fig. 9 of the drawings, the pivoted arms or levers 40 are provided with brake-shoes 41 for engagement with the cylindrical outer surface of the housing 7, to prevent rotation of the latter, when such is necessary or desirable, as will hereinafter more fully appear. The wedge-shaped cam 42 engages the rollers 43 on the adjacent ends of the levers 40, and this cam is mounted on the lower end of a vertically movable rod 44, and the upper end of this rod is pivoted to one arm of a bell crank 45, mounted on the top of the housing 1, as shown in Fig. 5 of the drawings. The upper end of this bell crank 45 is pivotally connected to a pull-rod 46, and with the provisions thus shown and described, the ring 23 and the brake-shoes 34, and the brake-shoes 41, can be manually operated or controlled in any suitable or desired manner.

For example, as shown in Figs. 1 to 4 of the drawings, the rods 32 and 39 and 46 are connected, respectively, to the parallel blocks 47, 48 and 49, as shown in Fig. 1 of the drawings. At one end, these blocks have their tops provided with the notches 50, 51 and 52, that are normally in alignment transversely of the blocks, and a block 53, of a length equal to the combined or overall width of the blocks 47, 48 and 49, has a groove 54 on its top. Said block 53 is connected by a pull-rod 55, below the floor 56, with the pedal 57, which latter is in the position ordinarily occupied by the usual clutch pedal of a motor vehicle. On the under side of the floor 56, a block 58 is mounted to slide transversely of the vehicle, and is provided with a supplemental block 59, of the same width as each of the blocks 47, 48 and 49, this supplemental block having downwardly extending end portions 60 and 61 for engagement, respectively, with the notches 50, 51 and 52, on the one hand, and the groove 54, on the other hand. In this way, the block 59 can be moved into position to connect the block 53 with any one of the blocks 47, 48 and 49, selectively, and for this purpose the block 58 is connected to a rod or bar 62 on a rock-shaft 63, which latter may be mounted in suitable bearings below the floor 56 of the vehicle. For rocking this shaft 63, manually, in order to place the pedal 57 in control of any one of the bars 47, 48 and 49, the shaft 63 is provided at its forward end with a crank-arm 64, connected by a vertically disposed rod 65 with a crank-arm 66, mounted in front of the dash 67 of the vehicle. Behind the dash, inside of the car, on the short rock-shaft 68, that carries the crank-arm 66, a handle 69 is provided, with the pointer 70 adapted to be moved from one position to another on the dial 71 of the dash. Below the floor, on the support 72, for the sliding block 58 previously mentioned, pivoted latches 73 are provided for engaging the notches 74 on the bottoms of the blocks 47, 48 and 49. The block 49 has its under side provided with a cam 75, for engaging the upwardly extending portions 76 of the said latches 73, as will hereinafter more fully appear in the description of the operation of the mechanism thus constructed. The latches 73 have springs 77 for holding them in normal position, as shown in Fig. 3 of the drawings.

As shown in Figs. 10 to 16, inclusive, the construction involves the same general principles, and features of construction, involved in the construction shown and described in Figs. 1 to 9, inclusive, and the construction is as follows: The input shaft 78, shown at the left in Fig. 10 of the drawings, is driven by the motor of the vehicle, and has the clutch plates or disks 79 keyed thereto. The other clutch plates 80 are slidingly keyed to the cylindrical body 81, and the latter is rigid with the clutch plate 82, which latter has an integral sleeve 83, which is rotatable on the end portion 84 of the shaft 78, and on the end portion 85 of the intermediate shaft 86, these two shafts together forming in effect one entire input shaft and being in alignment with the output shaft 87 at the right of the mechanism shown in Fig. 10 of the drawings. The slidable clamping plate 88 of the disk clutch on the shaft 78 is operated by the cams 89 of the arms 90, that are obviously supported by a suitable ring 91, fixed on the engine shaft adjacent the plate 88 of this clutch, and that are provided with balls or weights 92, that are subject to the tension of the springs 93, hitched to the ring 94 that encircles said arms, whereby these cams 89 are subject to centrifugal force, when the shaft 78 is rotated, serving to push the plate 88 against the disks of the clutch and thereby close the latter, causing the shaft 78 to become rigid with the body 81 and the sleeve 83, so that the latter and the shaft will rotate in unison. The pinion or sun-gear 95 of an input planetary gearing is keyed on the end of the sleeve 83 and engages the idlers or planets 96, carried on the planet-carrier 97, which latter is keyed or fixed on the shaft 86, previously mentioned. The ring-gear 98, that engages the planets 96, has a body portion 99 that rotates freely on the sleeve 83, during the action of the planetary gearing thus provided. Said ring-gear is rigid with the cylindrical body 100 in which are slidingly keyed the disks 101 of another disk clutch. The other disks 102 of this clutch are slidingly keyed on the sleeve or hub 103 of the planet-carrier 97. The movable clamping plate 104 of this disk clutch is slidable upon the sleeve or hub 103, for the purpose of closing the clutch, so that the sleeve 83 and the sleeve 103 will be rigidly connected and will rotate in unison, thereby causing the shaft 78 and the shaft 86 to rotate in unison. There is also a third disk clutch comprising the disks 105, which are keyed to the cylindrical body 106, and the disks 107, which are slidingly keyed to the sleeve 108, which latter is rigid with the clamping plate 109 of this third friction clutch. The movable clamping plate 110 is slidable on the sleeve 108, and pins 111 are loosely inserted through the plates 109 and 110 to engage the clamping plate 104, previously mentioned. These pins are operated endwise by a movable ring 112, having a lost motion connection with each pin, whereby the pins are not actuated until such lost motion has been taken up by the movement of the ring. Coil springs 113 are interposed between the ring and the plate 110, to actuate the latter when the ring is moved to the left, thereby closing the third clutch by the movement of the clamping plate 110 thereof. Thereafter, as soon as the lost motion between the pins 111 and the ring 112 is taken up, the second clutch will be closed by the movement of the clamping plate 104 thereof. For the actuation of the ring 112, cams 114 are provided, in engagement therewith, on arms 115 having balls or weights 116, like those previously described, these arms being pivotally mounted on the sleeve 108 in any suitable or desired manner, as shown in Fig. 10 of the drawings. A cam ring 117 engages the arms 115, and is connected by springs 118 with weights 116, whereby the latter are held normally against the sleeve 108, in the manner shown in the drawings. The middle pinion or sun-gear 119 is keyed on the shaft 86 to engage the idlers or planets 120, mounted on the planet-carrier 121, which latter is integral with the sleeve 108, previously mentioned. The ring-gear 122 is rigid with the cylindrical body 106, and engages the planets 120, thus forming a second planetary gearing for the mechanism. It will also be seen that the carrier for the planets 120 includes the disk or plate 123, which is integral with the sleeve 124, which latter is keyed or splined to the shaft 87. The ring-gear 98 has an encircling roller-brake device, comprising the stationary ring 125, provided with notches 126 on the inner periphery thereof, with rollers 127 in said notches, engaging the outer periphery of the said gear ring. With this provision, said gear ring can rotate in one direction, but is held by the said rollers against rotation in the other direction, because of the shape of the said notches 126, as will be readily understood. The ring-gear 122 has a similar roller-brake device 128, so that this ring-gear can rotate freely in one direction, but cannot rotate in the other direction. Thus, the mechanism shown in Fig. 10 provides an automatic three-speed forward drive for the motor vehicle.

Figure 12:
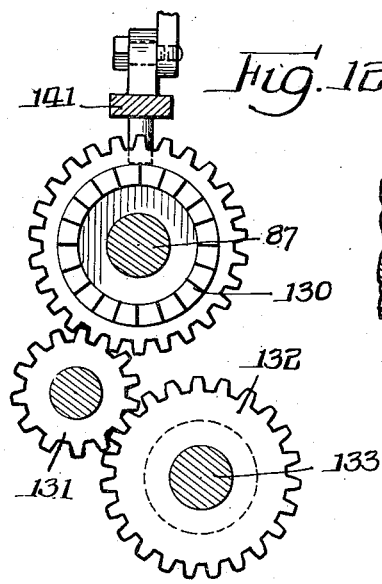
Fig. 12 is a detail section on line 12—12 in Fig. 11 of the drawings.
Figure 13:
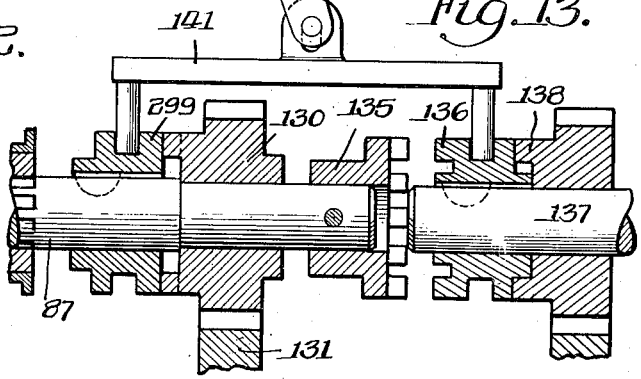
Fig. 13 is a fragmentary sectional view showing certain elements shown in Fig. 11, in a different position.

To reverse the mechanism shown in Fig. 10, to give a reverse drive for the motor vehicle, any suitable or desired arrangement can be employed, but that shown in Figs. 11 to 13 is found to be effective for that purpose. As shown in these views of the drawings, the shaft 87, previously mentioned, has a sliding toothed clutch member 129 keyed thereon to engage the other toothed clutch member 130, which latter is loose on said shaft. The member 130 is in the form of a pinion engaging the idler pinion 131, and the latter engages the gear or pinion 132 on the counter shaft 133, which latter is supported in suitable bearings on the outside casing or housing 134, similar to the housing previously described. A toothed clutch member 135 is fixed on the end portion of the shaft 87, and a sliding toothed clutch member 136 is slidable on the shaft 137, upon which latter there is a loose toothed clutch member 138, and the sleeve 139 is fixed on the outer end portion of the shaft 137 and has rotatable engagement with the shaft 140, which latter becomes the ultimate output shaft of the entire mechanism. The two sliding clutch members 129 and 136 are engaged by a movable yoke 141, so that these clutch members have axial displacement in unison, and the loose clutch member 138 is in the form of a pinion having engagement with the pinion or gear 142, fixed on the shaft 133, previously mentioned. A rod 143 is suitably connected to the yoke 141, so that by shifting the latter to the left or to the right, the transmission may be effected through the clutch mechanism parts, as shown in Fig. 11, in which case the shaft 87 will rotate in unison with the shaft 140, for driving the motor vehicle forward. To reverse the vehicle, the clutch mechanism is shifted, as shown in Fig. 13 of the drawings, so that the transmission is then through the counter shaft 133, with the result that the shafts 87 and 140 will rotate in opposite directions.

The mechanism thus shown in Figs. 10 and 11 can be controlled in any suitable or desired manner, but the devices shown in Figs. 15 and 16, in combination with certain devices shown in Figs. 10 and 11, are found to be effective for that purpose, as follows: An axially movable ring 144 is provided for engaging the balls or weights 92, when it is desired to prevent the latter from being thrown or moved away from each other by centrifugal force. A similar ring 145 is provided for the balls or weights 116, and it will be seen that both of these control rings are similar to the ring 23, previously described. A rod 146 is suitably connected to operate the ring 144, in the manner previously described, and a rod 147 is similarly connected to the ring 145, to control the latter, whereby either the ring 144 or the ring 145 may be moved axially to control the centrifugal instrumentalities of the disk clutches. In Figs. 15 and 16, there are three three blocks 148, 149 and 150, similar to the blocks shown and described in connection with Fig. 1 of the drawings, and to these blocks the rods 146, 147 and 143 are connected in the manner shown, arranged below the floor 56 of the vehicle, in the same manner illustrated in Fig. 1 of the drawings. The grooved block 151 is similar to the block 53, previously described, and is connected by a rod 152 with the pedal 153, which is like the pedal 57, previously described.

Fig. 16 is a sectional and more or less diagrammatic view of the mechanism involved in Fig. 15 of the drawings, similar to what is shown in Fig. 4 of the drawings, showing that the mechanism in Figs. 15 and 16 has a transversely sliding block 154, similar to the block 59, previously described, except that it is three times as wide, so that it may operate endwise with the block 148, or with the blocks 148 and 149 in unison, or with all three blocks 148, 149 and 150 in unison, as will be readily understood. This block 154 is movable endwise in its carrier block, which latter is like the block 58, previously described, whereby the block 154, like the block 59, may have endwise motion with the blocks 148, 149 and 150. The mechanism shown in Figs. 15 and 16 is provided with the elements 73, 74, 75, 76 and 77, shown in Fig. 3 of the drawings. Also, the mechanism of Fig. 15 has an indicator dial 155 on the dash, with a handle pointer 156 on the end of the short rock-shaft 157 mounted in the dash. This rock-shaft is connected by a bell crank 158 and 159 with the bell crank 160 on the end of the rock-shaft 161, which latter is similar to the rock-shaft 63, previously mentioned, having a bell crank 162 connected by the link 163 with the sliding block of the mechanism shown in Figs. 15 and 16, which sliding block is similar to the block 58 shown in Figs. 2 and 3 of the drawings. As in Fig. 4, the mechanism of Fig. 15 has an additional block 164, notched to engage the block 154, when the latter is in the position shown in Fig. 16 of the drawings, in which position the block 154, although engaging the block 148, cannot actuate the latter when the pedal 153 is released, after being pushed forward.

The operation of the mechanism shown in Figs. 1 to 9, inclusive: Assuming that the balls or weights 15 are in the position shown in Fig. 5 of the drawings, and assuming that the vehicle is standing still, and that the driver wishes to start driving forward, the pedal 57 will be pushed forward and the indicator 70 will then be turned to the point on the dial 71, marked "Automatic". This will cause the block 59 to connect the blocks 47 and 53 rigidly together. When the pedal 57 is released, and is allowed to move backward, the block 47 will be actuated to shift the ring 23 into the position shown in Fig. 6 of the drawings. When the engine or motor is started, the shaft 2 will rotate, and the springs 16, having been properly tensioned or adjusted, the balls or weights 15 will move away from each other and into the position indicated in Fig. 6 of the drawings, thereby actuating the clutch plate 11 and causing the disk clutch, shown in Fig. 5, to close. Of course, the closing is gradual, as the speed of the engine increases, so that while the driving of the shaft 70 is first through the planetary gears 17, 18 and 20, with the latter rotating backward, during the slippage of the clutch, the speed will soon become sufficient to entirely close the clutch, so that the ring 20 and the pinion 17 will, in effect, be rigidly connected together, and the shaft 2 and the shaft 4 will then rotate in unison, the said planetary gearing having become inoperative as such, and having become, in effect, a solid mass of metal, thus rigidly connecting the shaft 2 and the shaft 4 together for high speed transmission. In effect, therefore, the clutch mechanism and gearing, when thus used, provides a ratio for slow starting, followed by a gradual increase to a direct drive from the engine to the propeller shaft 4, which latter may be connected to the wheels of the vehicle in any suitable or desired manner. If the vehicle be slowed up, the clutch plates 10 and 11 will begin to separate a little, thus providing slippage and stoppage of the vehicle, with the balls or weights 15 in the position shown in Fig. 5 of the drawings, and the vehicle is ready to start forward again in the same manner just described. If it be desired to obtain the equivalent of what is ordinarily called "low", with an ordinary change speed transmission gearing, the pointer 70 will be set at the point marked "Low" on the dial 71, so that the block 59 will then connect the block 49 with the block 53, and when the pedal 57 is released and moves backward, it will actuate the block 49 and thereby produce a pull on the rod 46 that will in turn actuate the brake-shoes 41, shown in Fig. 9 of the drawings. This will hold the ring 20 against rotation, and will provide a low speed drive from the shaft 2 to the shaft 4, through the action of the planet gears 17 and 18 and the ring 20, in the manner required for low speed and greater power, as in climbing a hill. When it is desired to reverse the motor vehicle, the indicator 70 will be set at the point marked "Reverse" on the dial 71, with the result that the block 59 will connect the block 53 with the block 48, so that the releasing of the pedal 57 will then produce a pull on the rod 39, causing the brake-shoes 34 to grip the member 27, thus holding the latter against rotation, causing the shaft 4 to rotate in a direction opposite to that in which the shaft 2 is always rotated by the engine or motor. At such time, the shaft 2 and the body or drum 7 will relatively rotate in opposite directions. At such time the ring 23 is in the position shown in Fig. 5 of the drawings, and the friction clutch 10 and 11 will not be closed. That means that the pinion 17 and the gear ring 20 are rotating in opposite directions, but with a sufficient differential to rotate the planet-carrier 19 in the reverse direction, which is in the direction necessary for rotating the shaft 4 backward for a reverse drive of the vehicle. When the pointer 70 is placed at the point indicated as "Neutral" on the dial 71, the ring 23 is then in the position shown in Fig. 5 of the drawings, and any starting of the engine or motor will not produce any transmission of power from the shaft 2 to the shaft 4, inasmuch as with the parts in that condition, the clutch 10 and 11 cannot close, no matter how fast the shaft 2 may be rotated, as the balls or weights 15 will be held by the ring 23 against any centrifugal movement. The dogs or latches 73 hold the blocks 47, 48 and 49 against movement, when the block 53 is moved forward, with the exception of the one that has been engaged by the block 59, and the cam 75 of the latter will push the catch 73 downward far enough to release the block 47, 48 or 49 that has been selected for operation by the positioning of the pointer 70 on the dial. When the pointer 70 is moved to "neutral", the block 59 then occupies the position shown in Fig. 4, and in such position, any operation of the pedal 57 could not affect an actuation of any one of the blocks 47, 48 and 49, as under such conditions the block 59 is inoperative to produce any such actuation. In starting forward, in "automatic", the outward movement of the balls or weights 15 is resisted by the laterally shifting ring 24, and by the consequent increasing tension of the springs 16, and by properly adjusting the tension of the action of the ring, the closing of the clutch 10 and 11 can be made either slower or faster, as may be desired, and it should at least be slow enough to prevent a too quick closing of the clutch and the consequent abrupt rotation of the propeller shaft 4 that drives the traction wheels of the vehicle.

Operation of the transmission mechanism shown in Figs. 10 to 16 of the drawings: It will be seen that the controls from the dash to the transmission mechanism, as shown in Fig. 15 of the drawings, is very similar to that previously described, for the dial is similarly marked, and the pointer handle 156 will be set at the desired position, according to what is wanted, after the pedal 153 is pressed forward, and when this pedal is released, it will then actuate either the block 148, for automatic drive, and the blocks 148 and 149 for low, or all three blocks 148, 149 and 150 for reverse, depending upon the positioning of the block 154 by the pointer handle 156, in the manner described and indicated. If the block 154 be moved into engagement with the block 148 only, so that the block 148 is connected to the block 151, then the parts are in position for a straightforward automatic drive, beginning with low and increasing to high, in the manner previously described. Under such circumstances, the clutch 82 and 88 will close first, as the result of the action of the cams 89, as soon as the shaft 78 attains sufficient rotary speed. That will result in driving the shaft 87 at relatively low speed, through both planetary gearings. As the speed of the shaft 86 increases, the balls or weights 116 will move away from each other, with the result that the cams 114 will cause the ring 112 to move forward, causing the spring 113 to move the plate 110 far enough to close the clutch disks between this plate and the other plate 109 of this friction clutch. With the gear ring 122 held against rotation in one direction, by the roller-brake device 128, the shaft 87 will be rotated at a higher speed, approximating what is ordinarily called "second". As the speed of the shaft 86 increases, from first to second, and from the latter to higher speed, the balls or weights 116 move farther apart until the lost motion between the pins 111 and the ring 112 is taken up, so that these pins are caused to push against the clutch plate 104, whereby the latter cooperates with the fixed clutch plate 97 to clamp the disks between them, whereby this friction clutch is then closed. With the gear ring 98 now held against rotation in one direction by the roller clutch device 125, previously described, and with all three disk clutches closed, it will be seen that the shaft 87 becomes rigidly connected to the shaft 78, and under such circumstances the shaft 87 is rotated at a third speed, approximating what is ordinarily called "high" with an ordinary vehicle drive, although in fact, with the engine shaft and the propeller shaft thus rotating at the same speed, it is one-to-one ratio, so to speak, but it is nevertheless true that with the gearing shown in Fig. 10, the automatic forward drive has three distinct speeds, a low, a second, and a high, instead of an indefinite number of speeds between low and high, as is the case of the gearing shown in Fig. 5 of the drawings. As shown in Fig. 15, the pointer handle 156 is adjustable to the position marked "Low", or to the position marked "Neutral", or to the position marked "Reverse", after the pedal 153 is pressed forward. For low, the block 154 is moved into engagement with both of the blocks 148 and 149, for this will prevent the closing of the clutches 109, 110, and 97, 104, leaving only the clutch 82, 88, closed, so that the shaft 87 will continue to rotate at low speed, as in going up a hill, or with any other increase of load. For reverse, the block 154 is moved into engagement with all three blocks 148, 149 and 150, which means that the shaft 87 will be driven at low speed in the opposite direction, by reason of the pull on the rod 143, which closes the reversing mechanism shown in Figs. 11, 12 and 13 of the drawings, as previously described. When the block 154 is in engagement with the stationary block 164, the gearing is in neutral, so to speak, so that the engine may idle without transmitting any power to the propeller shaft 140 that leads to the rear axle of the vehicle. Of course, while the vehicle is traveling straight ahead, the reversing mechanism is in the position shown in Fig. 11 of the drawings, and the transmission is straight through to the propeller shaft 140 instead of through the counter shaft 133; but, as previously explained, when the reversing clutch mechanism is moved to the position shown in Fig. 13 of the drawings, then the transmission is at low speed through the counter shaft 133, with the result that the propeller shaft 140 is then rotated in the opposite direction, for the purpose of reversing the motion and causing the motor vehicle to travel backward instead of forward.

From the foregoing, it will be seen that in both forms of the invention, the transmission is from the engine shaft through an automatically controlled centrifugal clutch to a planetary gearing. In Fig. 5 of the drawings, the transmission is from the automatic clutch 10, 11, to the planetary gearing at the right of this clutch. In Fig. 10 of the drawings, the primary transmission is from the clutch 82, 88, to the planetary gearing immediately at the right of this clutch, whereby in both forms of the invention it is an automatic centrifugal clutch that transmits power and motion from the engine shaft to a planetary gearing. In each case, the result is a low speed first, for the propeller shaft of the vehicle. In Fig. 5 of the drawings, this low speed is followed by an indefinite number of higher speeds until the maximum or high speed desired for the propeller shaft is obtained. In Fig. 10, however, as explained, this starting low speed is followed by a higher and definite speed, equivalent to the intermediate or second speed of the ordinary motor vehicle, and such second speed is then followed by a definite higher speed which is equivalent to the high of the ordinary motor vehicle. However, as shown and described, in each form of the invention, the primary action, when the engine shaft is started, is the automatic closing of a centrifugally controlled disk clutch, followed by a transmission of power from said clutch to a planetary gearing. In each form of the invention, such planetary gearing has an outer internal gear ring that is provided with braking means, or clutch means, of any suitable character, to hold it against rotation to produce the desired effect. In Fig. 5 of the drawings, the reversing effect, to drive the motor vehicle backward, is inherent in the clutch and planetary gear mechanism itself. However, in Fig. 10, as explained, a separate reversing mechanism, as shown in Fig. 11, is employed outside of, and separate from, the automatic change speed gearing, at a point between the latter and the propeller shaft, for the purpose of causing the motor vehicle to travel backward.

It will be observed, therefore, that in each form of the invention there is disk clutch mechanism disposed between and axially aligned with two planetary sets of gears, within a drum that is rigid with both of the internal gear rings of said gear sets, and in each form of the invention there is an axially movable ring in said drum for controlling the centrifugal means by which the clutch mechanism is automatically closed. It is the drum 7 in Figs. 5 and 6, or the drum 106 shown in Fig. 10, that is here referred to.

It will be seen that in Fig. 5 of the drawings, the cylinder 7 is in effect a rotary drum enclosing the clutch mechanism, and having the gearing, the planetary gearing, incorporated in the heads thereof, which is substantially the same in Fig. 10, in which the cylinders 100 and 106 form a two-section drum having the planetary gearing incorporated in the heads thereof, with the clutch mechanism inside the drum, and in each form of the invention the drum, whether composed of one section, or two sections, has the planetary gearing incorporated in the heads or opposite ends thereof.

It will be seen that in Figs. 5 to 9 inclusive the ring 23 has pins 165 rigidly inserted therein, which pins extend through the slots 166 in the sides of the rotary drum 7, and the outer ends of which pins revolve in the annular groove 167 of the ring 168, which latter is held against rotation by the control yoke 29 previously described. Thus the ring 23 and the drum 7 rotate in unison, and have relative axial movement, as the ring 23 is movable axially in the manner previously described. In Figs. 10 to 14 of the drawings the rings 144 and 145 are similarly connected to the outside rings 169 and 170, the ring 169 being connected to the rod 146, and the ring 170 to the rod 147, whereby the grooved rings 169 and 170 are held against rotation, while the rings 144 and 145 rotate with the casings or drums 81 and 106, in the manner previously explained, as the inside rings 144 and 145 are connected by pins 171 and 172 through the slots 173 and 174 with the outside rings 169 and 170, just as the similar rings are connected in Figs. 5 to 9 of the drawings.

What I claim as my invention is:

1. In an automatic change speed transmission, for use in driving a motor vehicle at different speeds, the combination of clutch mechanism adapted to be automatically closed by centrifugal action, by the rotation of the engine shaft, planetary gearing disposed in position to receive power and motion through said clutch, and instrumentalities whereby said planetary gearing is operative to first rotate the propeller shaft for the vehicle at relatively low speed, and to automatically change the ratio and increase the speed until the propeller shaft is rotating at a higher speed in combination with a foot-pedal, three parallel endwise movable blocks, a selector device having means for linking the pedal and the blocks together, selectively, and control means extending between said blocks and the centrifugal clutch mechanism, whereby to prevent or permit the centrifugal action, for the purpose of manual control of the transmission.

2. In an automatic change speed transmission, for use in driving a motor vehicle at different speeds, the combination of clutch mechanism adapted to be automatically closed by centrifugal action, by the rotation of the engine shaft, planetary gearing disposed in position to receive power and motion through said clutch, and instrumentalities whereby said planetary gearing is operative to first rotate the propeller shaft for the vehicle at relatively low speed, and to automatically change the ratio and increase the speed until the propeller shaft is rotating at a higher speed in combination with a foot-pedal, three parallel endwise movable blocks, a selector device having means for linking the pedal and the blocks together, selectively, and control means extending between said blocks and the centrifugal clutch mechanism, whereby to prevent or permit the centrifugal action, for the purpose of manual control of the transmission, said blocks being selectively operative by the return of the foot-pedal to normal position, after being pressed forward, and said selector device being operative while the pedal is in forward position.

3. In a change speed transmission, for use in driving a motor vehicle at different speeds, the combination of a planetary gearing, another planetary gearing axially aligned with the first-mentioned gearing, disk clutch mechanism disposed between the one gearing and the other gearing, axially aligned therewith, centrifugally operated means for automatically closing said clutch, instrumentalities cooperating with said gearing and clutch mechanism to provide different ratios of transmission, an axially movable ring disposed between said clutch mechanism and one said gearing, adapted to be interposed to prevent the operation of said centrifugal means, and means for manually shifting said ring, there being means having longitudinal slots forming guiding means through which said movable ring is controlled.

4. In a change speed transmission, for use in driving a motor vehicle at different speeds, the combination of a planetary gearing, another planetary gearing axially aligned with the first-mentioned gearing, disk clutch mechanism disposed between the one gearing and the other gearing, axially aligned therewith, centrifugally operated means for automatically closing said clutch, instrumentalities cooperating with said gearing and clutch mechanism to provide different ratios of transmission, an axially movable ring disposed between said clutch mechanism and one said gearing, adapted to be interposed to prevent the operation of said centrifugal means, and means for manually shifting said ring, comprising a plurality of manual control connections extending to said automatic change speed transmission, an endwise movable block for each connection, a pedal, a member movable by said pedal, and means for selectively connecting said member to any desired block, to provide selective pedal control over said transmission.

5. In a change speed transmission, for use in driving a motor vehicle at different speeds, the combination of a planetary gearing, another planetary gearing axially aligned with the first-mentioned gearing, disk clutch mechanism disposed between the one gearing and the other gearing, axially aligned therewith, centrifugally operated means for automatically closing said clutch, instrumentalities cooperating with said gearing and clutch mechanism to provide different ratios of transmission, an axially movable ring disposed between said clutch mechanism and one said gearing, adapted to be interposed to prevent the operation of said centrifugal means, and means for manually shifting said ring, comprising a plurality of manual control connections extending to said automatic change speed transmission, an endwise movable block for each connection, a pedal, a member movable by said pedal, and means for selectively connecting said member to any desired block, to provide selective pedal control over said transmission, together with a dial device to indicate which control connection is desired.

6. In a change speed transmission, for use in driving a motor vehicle at different speeds, the combination of a planetary gearing, another planetary gearing axially aligned with the first-mentioned gearing, disk clutch mechanism disposed between the one gearing and the other gearing, axially aligned therewith, centrifugally operated means for automatically closing said clutch mechanism, disposed between the clutch mechanism and one gearing, so that said clutch mechanism is between said centrifugal means and the other gearing, instrumentalities cooperating with said gearing and clutch mechanism to provide different ratios of transmission, an axially movable rotary ring disposed between said clutch mechanism and said one gearing, adapted to be interposed to prevent the operation of said centrifugal means, and instrumentalities for manually shifting said ring, together with guiding means for said ring at the outer periphery thereof, rotatable in unison therewith.

7. A structure as specified in claim 6, said clutch mechanism comprising a plurality of axially aligned separate disk clutches, and means whereby these separate clutches are successively closed by said centrifugal means.

8. A structure as specified in claim 6, comprising an axial input shaft and an axial output shaft axially aligned with said gearing and clutch mechanism, the input shaft extending through both gearings and having some of the disks of said automatic clutch mechanism fixed thereon.

9. A structure as specified in claim 6, comprising a rotary drum enclosing said clutch mechanism, supporting said axially movable ring and some of the disks of said mechanism, and forming said guiding means for the axial motion of the ring, each gearing having an internal tooth gear ring rigid with said drum.

10. A structure as specified in claim 6, comprising another disk clutch mechanism at the input end of said automatic change speed transmission, and centrifugally operated means for closing this second clutch mechanism, the latter being disposed between said last mentioned centrifugal means and said first mentioned clutch, together with another axially movable ring for engaging and preventing the operation of said last-mentioned centrifugal means.

11. A structure as specified in claim 6, said clutch mechanism comprising two separate clutches controlled successively by said centrifugal means.

12. A structure as specified in claim 6, comprising another disk clutch mechanism at the input end of said automatic change speed transmission, and centrifugally operated means for closing this second clutch mechanism, the latter being disposed between said last mentioned centrifugal means and said first mentioned clutch.

13. A structure as specified in claim 6, comprising a plurality of manual control connections extending to and having controlling connection with said automatic change speed transmission, an endwise movable block for each connection, a pedal, a member movable by said pedal, and means movable crosswise of said member and blocks, for selectively connecting said member to any desired block, to provide selective pedal control over said transmission, having a dial device on the dash of the vehicle to indicate which control connection is desired.

14. A structure as specified in claim 6, there being rotary means enclosing said centrifugal means and having longitudinal slots forming said guiding means through which said movable ring is controlled.

15. A structure as specified in claim 6, comprising a plurality of manual control connections extending to and having controlling connection with said automatic change speed transmission, an endwise movable block for each connection, a pedal, a member movable by said pedal, and means movable crosswise of said member and blocks, for selectively connecting said member to any desired block, to provide selective pedal control over said transmission.

16. A structure as specified in claim 6, comprising means forming two axially aligned drum sections, forming one drum as a whole, said drum having a removable head at each end thereof, with said clutch mechanism and ring disposed between the heads of said drum sections, and with each gearing incorporated in one of said heads.

17. A structure as specified in claim 6, comprising a rotary drum enclosing said clutch mechanism, said drum having a removable head at each end thereof, with each gearing incorporated in one of said heads.

18. A structure as specified in claim 6, comprising a rotary drum axially aligned with and enclosing said clutch mechanism and ring, with internal tooth gear rings on the opposite ends of said drum, forming part of said gearing.

19. A structure as specified in claim 6, said centrifugal means comprising weights disposed between the two sets of gears and movable about axes disposed at right angles to the axis of said clutch mechanism and gearing, which axes are between the weights and the set of gears nearest the input end of the transmission.

20. In a change speed transmission, for use in driving a motor vehicle at different speeds, the combination with the transmission mechanism, of a plurality of control connections extending therefrom, parallel endwise movable blocks to which said connections are fastened, with transverse notches in said blocks, a pedal, a member actuated by said pedal, and sliding means operable transversely of said blocks, in said notches, for selectively connecting said member to any one of said blocks, to provide selective pedal control over said connections.

21. A structure as specified in claim 20, and dial means on the dash of the vehicle to indicate which member and block connection is desired, in combination with a longitudinal rock shaft operated by said dial means and connected to operate said sliding means.

22. A structure as specified in claim 20, having a notched member connected to the pedal, and said sliding means being slidable in the notch of said member.

23. A structure as specified in claim 20, said sliding means being wide enough to couple two or more of said blocks for movement in unison.

24. A structure as specified in claim 20, said sliding means being wide enough to couple two or all of said blocks for movement in unison.

25. A structure as specified in claim 6, comprising an integral input shaft extending through both gearings, with a sun gear fixed thereon, said shaft being supported at both ends of the transmission, and an output shaft in axial alignment with said input shaft to receive power from the latter.

26. A structure as specified in claim 6, comprising an integral input shaft having a sun gear fixed thereon.

27. A structure as specified in claim 6, the ring gear of each planetary gearing being supported for rotation, and means whereby each ring gear has rotation relatively to the other.

28. A structure as specified in claim 6, comprising an output shaft, and means whereby the latter is driven by the planet carrier of said other gearing.

EDWARD E. GIESEN.